Figure 1:
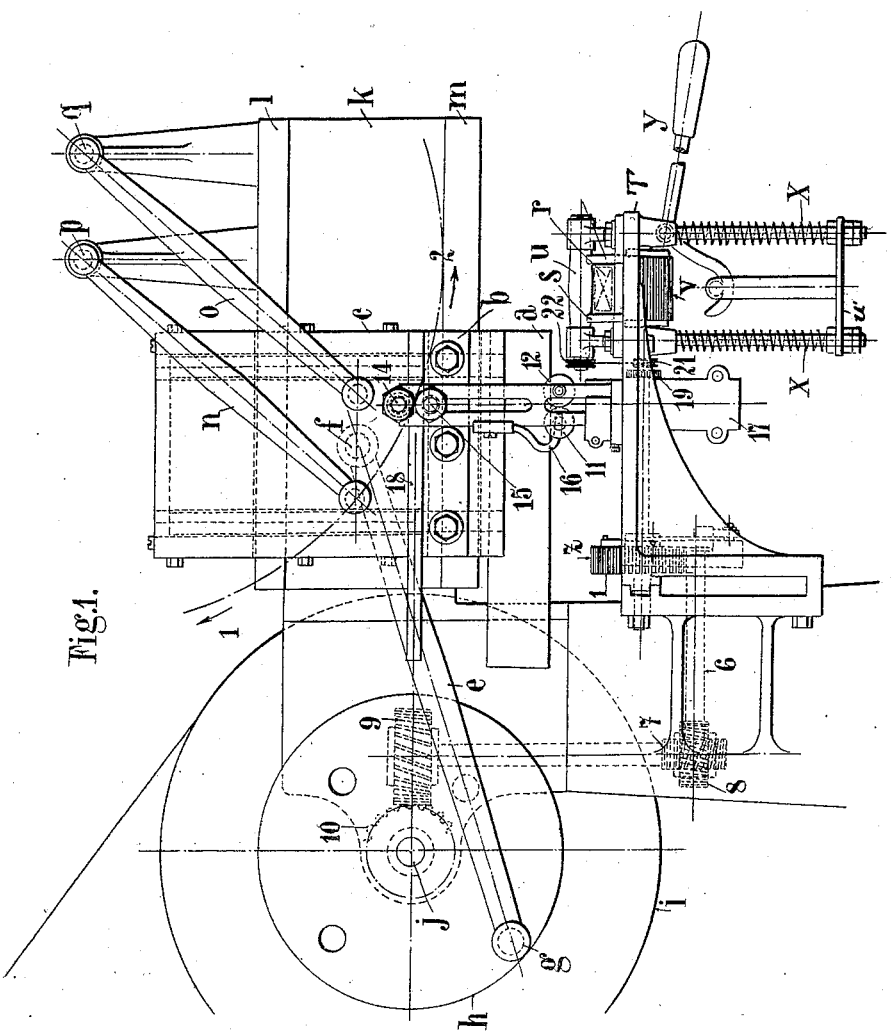

B. LAUER.
CORK CUTTING MACHINE.
APPLICATION FILED MAR. 24, 1908.

917,084.

Patented Apr. 6, 1909.
3 SHEETS—SHEET 1.

WITNESSES

INVENTOR
Berthold Lauer
BY
ATTORNEYS

B. LAUER.
CORK CUTTING MACHINE.
APPLICATION FILED MAR. 24, 1908.
917,084.
Patented Apr. 6, 1909.
3 SHEETS—SHEET 2.
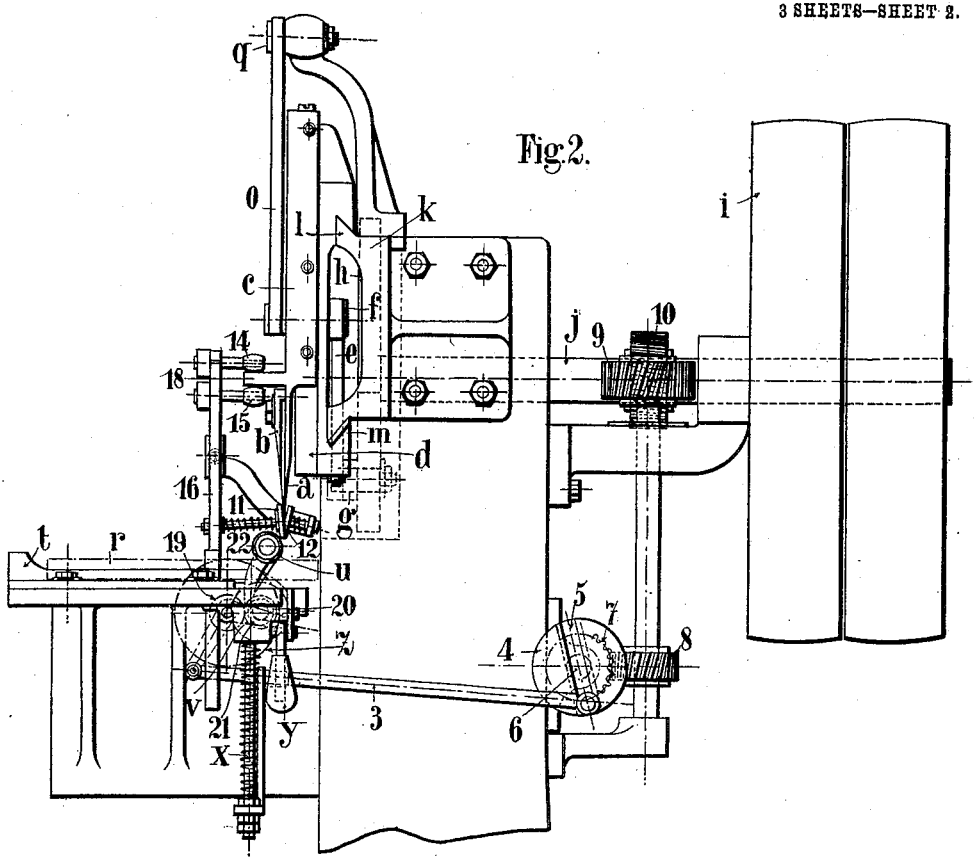
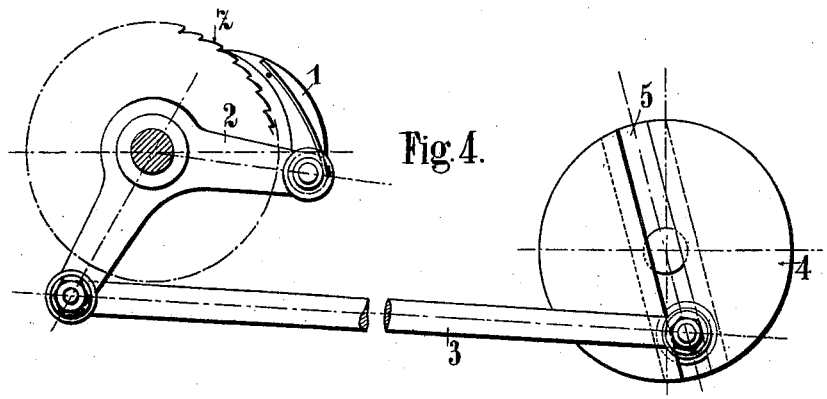
WITNESSES:
INVENTOR
Berthold Lauer
BY
ATTORNEYS.

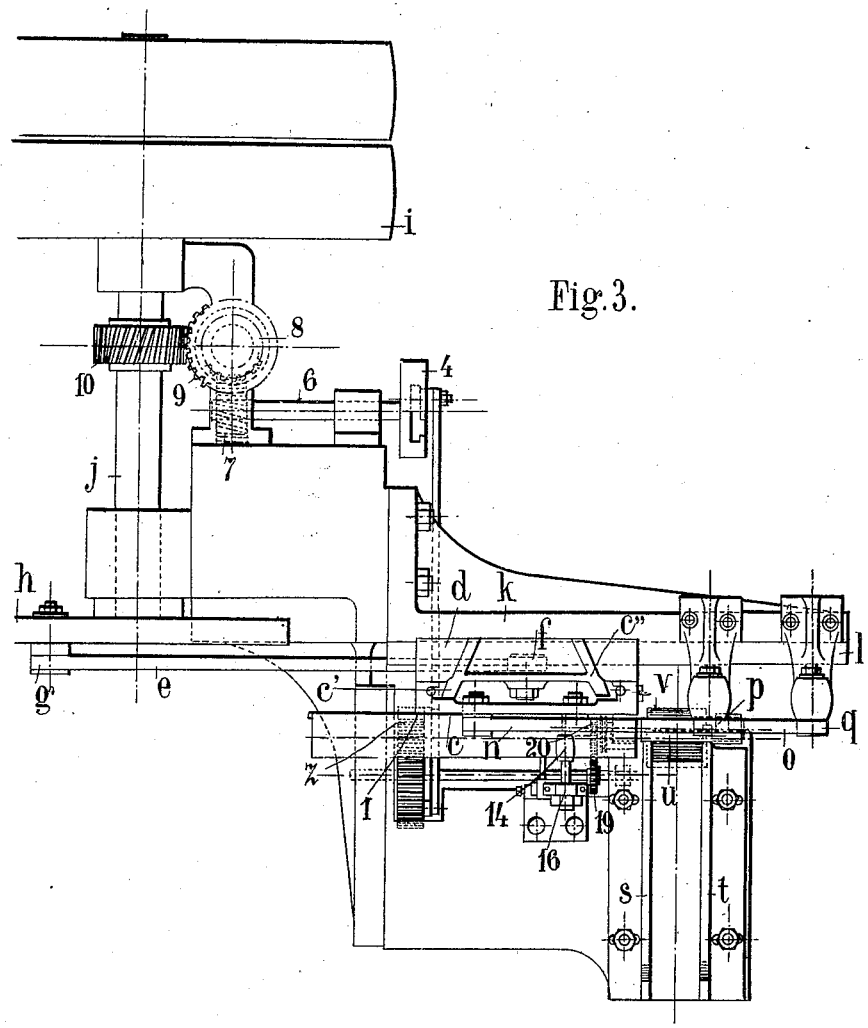

UNITED STATES PATENT OFFICE.

BERTHOLD LAUER, OF PARIS, FRANCE.

CORK-CUTTING MACHINE.

No. 917,084.　　　Specification of Letters Patent.　　　Patented April 6, 1909.

Application filed March 24, 1908. Serial No. 422,913.

*To all whom it may concern:*

Be it known that I, BERTHOLD LAUER, a citizen of the Republic of France, residing in Paris, France, have invented certain new and useful Improvements in Cork-Cutting Machines, of which the following is a specification.

This invention relates to an apparatus intended for cutting up strips or bands of cork into squares to be subsequently converted into cork stoppers.

The primary object of the invention is to provide an improved arrangement of the cutting knife, by which a shearing cut of the cork band is produced.

A further object of the invention is to furnish improved means by which the knife or cutter is ground and kept sharp, this means operating during the shearing movement of the knife and being actuated automatically by simple mechanism.

The invention also aims to provide improved mechanism for feeding the cork band to the knife.

In the accompanying drawing, Figure 1 is a front-elevation of a machine constructed according to the invention, Fig. 2 is a side-elevation of the same, Fig. 3 is a top plan-view, and Fig. 4 is a detail elevation of part of the feed mechanism.

The machine embodies in its construction a horizontal slide $k$ having at its upper and lower edges beveled portions $l$, $m$ about which fits a carriage $d$ adapted to be reciprocated horizontally on said slide. This reciprocating movement of the carriage is produced by its connection at $f$ with a connecting rod $e$ secured at $g$ to a wheel $h$ driven by a pulley $i$ or other suitable transmission.
Slidable vertically on the carriage $d$, by means of slides $c'$, $c''$, is a second carriage $c$ located at the front of the horizontally moving carriage $d$. At the lower part of the carriage $c$ the same carries a plate $b$ by means of which a knife or cutter $a$ at the lower extremity of the carriage $c$ is clamped in position. Said knife at the limit of its downward movement coöperates with a table T upon which the cork band to be cut is positioned.
The downward movement of the carriage $c$ is produced by its connection by connecting rods $n$, $o$ with fixed pivotal supports $p$, $q$ located above the slide $k$, as shown. Owing to this arrangement, when the carriage $d$ is reciprocated horizontally, the knife-carriage $c$ will partake of its reciprocatory movement and at the same time will be swung about the pivots $p$, $q$. This movement of the knife-carriage is indicated on Fig. 1 by the arrows 1, 2, and it will be seen that the knife during its downward movement will be moved laterally, while having its edge parallel to the plane of the table, so as to give a shearing cut to the cork band.

The cork band, which is denoted by reference character $r$, is positioned on the table T by means of guides $s$, $t$, which are adjustably fixed against the side-edges of the band, as shown in Fig. 1. The feed of the cork band to the knife is effected by means of two feed-rolls $u$, $v$, of which the upper feed-roll $u$ is mounted above the table to contact with the upper surface of the band, while the lower feed-roll $v$, which is preferably fluted, contacts with the band at its lower surface. The upper roll is acted on by means of springs $x$ to press the band against the lower roll $v$, and said upper roll $u$ may be raised by pressing down on a lever $y$ which pulls the roll $u$ upwardly by means of a frame $u'$ on which the springs $x$ are placed. The lower roll $v$ is actuated intermittently from a ratchet-wheel $z$ by means of gear-wheels 19 and 20. The spindle of said roll carries a pulley 21 connected by means of an elastic belt with another pulley 22 carried by the upper roll, so that the latter is also given a movement of rotation. The ratchet-wheel $z$ is operated by means of a pawl 1 secured to an arm 2 operated by a connecting rod 3 adjustably secured to a disk 4. The disk 4 is provided with a groove 5 in which the end of the connecting rod 3 is adjustably secured, and consequently in this way the movement of the pawl and ratchet can be controlled in order to give a feeding movement of the proper length. The disk 4 is mounted on a spindle 6, as shown in Fig. 3, this spindle receiving its movement from gear-wheels 7, 8, 9 and 10, of which the latter is keyed to the shaft $j$ of pulley $i$.

The mechanism for grinding the knife during its movement comprises an upright guide 17 supported by the table, and having vertically movable therein a slide-piece 16 carrying spring-pressed grinding rollers 11, 12, of which one presses against the rear-face of the knife, while the other operates on its front-face, as shown best in Fig. 2. At its upper part the slide-piece 16 carries rollers 14, 15 spaced apart from each other and arranged at the upper and lower surfaces respectively of a horizontal flange 18 extending across the knife-carriage c at its lower portion. It is evident that during the movement of the carriage c in the direction of the arrows 1, 2 the slide-piece with its rollers 11, 12 will be raised and lowered in consonance with the knife-carriage, so that the grinding rollers will be maintained in contact with the knife-edge. However, said grinding rollers have no lateral movement, as will be understood, and accordingly the lateral movement of the knife causes it to be drawn between said rollers throughout its length, thereby effecting the sharpening of the same.

Having thus described my invention, I claim as new and desire to secure by Letters Patent:

1. In a cork-cutting machine, the combination of a laterally moving carriage, a knife-carriage slidable with respect to the first carriage, and means pivotally supporting said knife-carriage to cause a vertical movement thereof.

2. In a cork-cutting machine, the combination of a laterally reciprocating carriage, a vertically sliding knife-carriage thereon, and a fixed pivotal support for the knife-carriage located above the same.

3. The combination of a laterally reciprocating carriage, a knife-carriage vertically slidable thereon, a fixed pivot, and a connecting rod connecting the pivot with said knife-carriage to cause a vertical movement of the knife during its lateral movement.

4. The combination of a laterally reciprocating carriage, a knife-carriage slidable vertically thereon, fixed pivots p, q above the knife-carriage, and connecting rods n, o connecting said pivots with said carriage.

5. The combination of a table, a carriage movable horizontally above said table, means to reciprocate said carriage horizontally, a knife-carriage slidable vertically on said first-named carriage, a knife at the lower part of said knife-carriage, and a swinging connection secured to said knife-carriage by which it is moved vertically.

6. The combination of a knife-carriage carrying a knife, means to give the same a shearing movement, a slide-piece connected with said carriage and carrying grinding rollers, and means by which the knife is drawn between said rollers.

7. The combination of a knife-carriage having a combined lateral and vertical movement, a knife, and a slide having a vertical movement and carrying grinding rollers between which the knife is drawn.

8. The combination of a knife-carriage having a combined lateral and vertical movement, a knife on said carriage at the lower part thereof, a slide-piece having a vertical movement only, means connecting said slide-piece with said knife-carriage by which the two move together vertically, and grinding devices carried by said slide-piece between which the knife is drawn laterally.

9. The combination of a carriage having a combined lateral and vertical movement, a knife at the lower part of said carriage, a flange on the carriage, a vertically moving slide-piece carrying rollers traveling on said flange at opposite sides, and grinding means on said slide-piece with respect to which the knife is moved laterally.

In testimony whereof I have signed this specification in the presence of two subscribing witnesses.

BERTHOLD LAUER.

Witnesses:
 EMILE LEDRET,
 H. C. COXE.